Patented Apr. 26, 1949

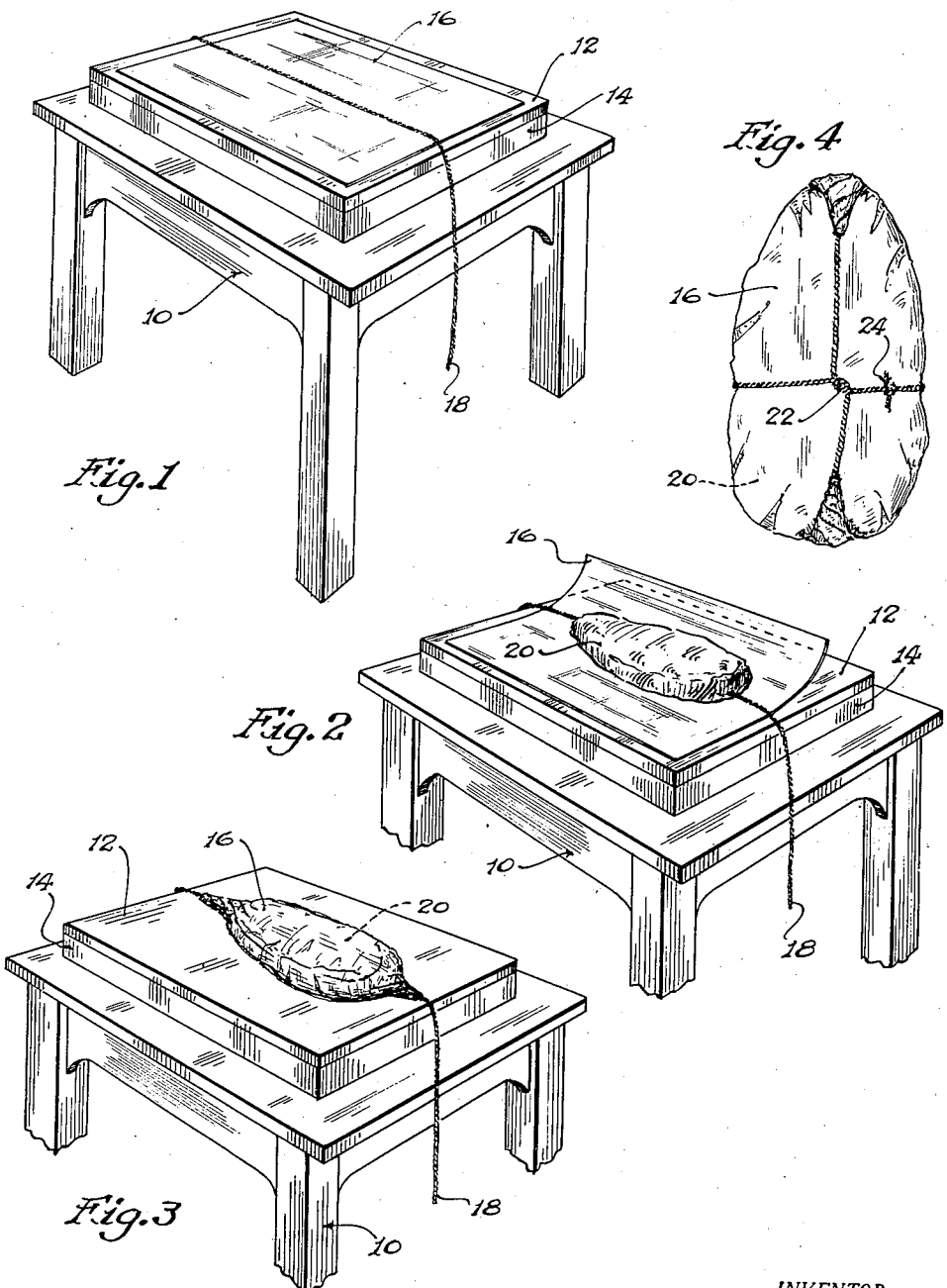

2,468,700

UNITED STATES PATENT OFFICE 2,468,700

PACKAGING FOOD PRODUCTS

John W. Ahrens, Chicago, Ill., assignor to Swift & Company, Chicago, Ill., a corporation of Illinois Application October 12, 1945, Serial No. 621,926

5 Claims. (Cl. 99—174)

This invention relates to improvements in meat product packages and the method of preparing the same and has particular reference to an improved meat package such as a smoked beef tongue or boned shoulder butt wrapped in a transparent covering secured in place by a flexible corrosion resistant strand.

The practice of wrapping generally rotund pieces of cured meat in wrappers of cellophane or similar transparent material has been prevalent in the meat processing industry for many years. For example, meat packages comprising cellophane wrapped packages of smoked and boned shoulder butt commonly referred to as "daisy hams" have long been a popular commodity. Considerable difficulty, however, has been experienced in properly and securely wrapping such packages.

In the first place, in order to provide a package of neat and attractive appearance it is necessary that the transparent covering be shrunken or otherwise held in close surface contact with the meat product. This requires a wetting or dampening of the sheet of covering material before it is applied, a close wrapping of the material about the meat product, and firm securement of the wrapper in place on the meat product.

The last of these requirements, namely, that of securing the transparent wrapper firmly in place on the meat product, is the one that has presented the greatest difficulty and in the past the wrappings have frequently been loosened in storage and transportation and in the ordinary handling of the products destroying the neat appearance of the packages and exposing the surface of the meat to the atmosphere.

Several attempts have been made to overcome the above described difficulty but none proved to be satisfactory prior to the present invention. In at least one case a strand of wire was used, the ends of the wrapping were twisted about the wire and the wire was then bent or coiled to hold the twist in the wrapping ends. It was found that not only was this method of wrapping expensive and difficult to accomplish, but that in the presence of the cured meat product the wire quickly rusted or corroded and failed to maintain its function so that the wrappings became loose and frequently were lost from the packages. The corrosion of the wire also discolored the meat. Moreover, the possibility of pieces of metal becoming embedded in the meat represented too great a hazard to make the idea practical.

Attempts have also been made to secure such packages by means of a string or cord tied around the outside of the wrapper. These attempts have also failed as the cord tends to slip on the outside of the wrapping and loosens or comes off of the package and, even if it stays in place, permits the wrapping to loosen and pull away from the surface of the meat.

The present invention overcomes the difficulties experienced in the past in a simple and expeditious manner by utilizing a cord or string which will maintain a tension around the package, utilizing the ends of the wrapping to maintain the cord in place and tying the cord about the package in such a manner that the wrapping will be firmly held in position.

It is therefore an object of the present invention to provide a meat product package in which a transparent wrapping is firmly held in place by a non-corrosive cord.

A further object resides in the provision of a meat product package of the character indicated above in which the transparent wrapping and the securing cord are mutually held in place at the ends of the package by twisting the end portions of the wrapping about the cord and tying the cord firmly about the package.

A still further object resides in the provision of an improved method of quickly and economically wrapping meat product packages in a manner in which both the transparent wrapping used to cover the package and the cord used to secure the wrapping are firmly retained in place and under tension.

Other objects and advantages will become apparent from the following description when considered with the accompanying drawings and from the appended claims.

In the drawings:

Figure 1 is a diagrammatical perspective view of the apparatus arranged for the initial step in the improved meat packaging method;

Figure 2 is a perspective view similar to Figure 1, showing a later stage in the improved meat packaging method;

Figure 3 is a diagrammatical perspective view similar to Figures 1 and 2 showing a still later stage in the preparation of meat packages according to the invention; and Figure 4 is a plan view of a completed meat package accomplished according to the invention.

With continued reference to the drawings wherein like reference numerals are used to designate similar parts throughout, the numeral 10 designates a table, bench, or other suitable work support upon which the meat wrapping operation is performed. Upon this table or bench 10 is supported a pad 12 which may, if desired, be secured upon a suitable base 14. This pad 12 is moisture absorbent and is preferably wetted at suitable intervals while being used in the meat wrapping procedure.

In order to form an improved meat product package according to the invention, a sheet 16 of thin transparent wrapping material, such as cellophane is placed upon the pad 12 so that it will absorb a limited amount of moisture from the pad during the wrapping procedure. A wrapper securing member 18 is then placed lengthwise across the sheet of wrapping material preferably dividing it into two substantially equal rectangular portions. A hemp or cotton fiber cord or string cut to the proper length, has been found entirely suitable for use in the improved meat product package. However, other members could be used without in any way exceeding the scope of the invention. Such members might include one or more textile or plastic fiber cords, combinations of cottons and plastics, several forms of rubber or synthetic rubber and may be provided either as a circular band or as a piece comprising a single strand or a plurality of strings having two separated ends.

After the securing member 18 has been placed in position, a meat cut 20, such as a smoked beef tongue or "daisy ham" is placed in position on the securing member and the wrapper sheet as illustrated in Figure 2. The dampened wrapper sheet is then folded tightly about the meat cut and the open ends at each end of the cut are twisted together around the securing member or fiber strand 18 in the manner indicated in Figure 3.

This twisting of the wrapper about the portion of the strand adjacent to the ends of the meat cut pulls the wrapper tightly upon the meat so that upon drying the shrinkage of the wrapping material will place the material under tension and force the wrapper firmly into contact with the surface of the meat.

After the ends of the wrapper have been firmly twisted about the strands, as indicated, the two ends of the strand are then moved toward each other, so that the twisted end portions of the wrapper are bent over and pressed firmly against the side of the package to prevent loosening or untwisting of the wrapper ends. The portions of the strand 18, beyond the twisted end portions of the wrapper are then crossed over approximately midway between the ends of the meat cut in a half-knot as indicated at 22 of Figure 4 and are wrapped around the cut in a direction substantially perpendicular to the portion of the strand within the wrapper and the ends are then secured together by a full knot, as indicated at 24. If desired, means other than a knot may be used for securing the ends together, for example heat sealing or a suitable clip.

The arrangement, with a portion of the strand like securing member within the wrapper and extending through the twisted end portions of the wrapper serves not only to secure the wrapper firmly in position so that it will shrink upon the meat cut and be held firmly in contact with the surface of the meat, but also serves to hold the securing member in position over the more or less pointed ends of the meat cut so that the securing member cannot slip on the smooth surface of the wrapper and thus cause the wrapping to become loosened. The half-knot in the securing member and the portion of the securing member extending around the package substantially at right angles to the remainder of the securing member also additionally secures the member against slippage and provides a firm and secure wrapping that will not become loosened in storage or transportation or in the usual handling of such articles. The securing member itself is preferably formed of a somewhat resilient material such as cotton fiber which has a tendency to shrink upon the package after the package has been completed so that it is tightly bound about the package at all times and cannot slip or become loosened. This member is also formed of a non-corrosive material so that the portion within the wrapper and in contact with the meat surface does not rust or corrode and consequently does not become weakened or discolor the meat surface.

Although I have described the invention in connection with the use of a crosstie as shown in Figure 4, it is contemplated that the crossing of the string at right angles by a half-knot 22 may be eliminated and the ends of the string 18 secured directly together making the string pass in one direction around the package.

Wrappers other than regenerated cellulose or cellophane may be used. For example films of cellulose ester, cellulose nitrate, rubber hydrochloride may be mentioned as other materials contemplated. The wrapper need not necessarily be transparent.

The method of packaging herein described may be performed by hand, but greater perfection may be possible by using a suitable mechanical device.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and language of equivalency of the claims are therefore intended to be embraced therein.

I claim:

1. A meat product package comprising, a meat cut of irregular generally rotund shape, a sheet of wrapping material folded about said meat cut; a securing member of resilient non-corrosive textile material having a portion disposed between said meat cut and said wrapping material, said portion being located intermediate of and a substantial distance from the sides of the wrapping sheet, having other portions twisted into the ends of said wrapping sheet at the ends of said meat cut, and another portion encircling said meat cut between the ends thereof; said member being tightly bound about said meat cut and being shrunk upon the package.

2. The method of preparing a meat product package which comprises, moistening a sheet of wrapping material on a work surface, placing a strand of non-corrosive textile material across said sheet of wrapping material, intermediate of and a substantial distance from the sides of said sheet, with portions thereof extending beyond the wrapping sheet; placing a meat cut over the wrapping sheet and the strand; folding the wrapping sheet about the meat cut and twisting its open end portions about the strand; binding the strand about the package in a manner such that the twisted end portions of the wrapper sheet are bent over toward each other and firmly held against the sides of the package and a portion of the strand externally surrounds the package between the twisted end portions and shrinking said wrapping sheet and said strand on the meat cut.

3. In a meat product package, the combination comprising a generally rotund body of meat which shrinks in volume after packaging, a sheet of wrapping material folded about the rotund body with the end portions of the wrapping material extending substantially beyond the ends of the said rotund body, and a securing member of a flexible, non-corrosive, resilient textile material which shrinks about the wrapping material and body of meat having a portion intermediate the ends thereof disposed longitudinally of the rotund body along its major axis between the rotund body and the wrapping material and having the ends thereof extending substantially beyond the end portions of the wrapping material, the said end portions of the wrapping material being twisted about the contiguous portions of the securing member, and the ends of the said securing member being fastened together binding the wrapping material tightly about the rotund body; whereby the wrapping material and the securing member are maintained securely in place on the rotund body despite shrinkage of the rotund body.

4. In a meat product package, the combination comprising a meat cut of generally rotund shape which shrinks in volume after packaging, a sheet of cellulosic wrapping material folded about the meat cut with the end portions of the wrapping material extending substantially beyond the ends of the said meat cut, and a fiber securing cord of resilient textile material which shrinks about the wrapping material and meat cut as the meat cut shrinks having a portion intermediate the ends thereof disposed lengthwise of the meat cut along its major axis between the meat cut and the wrapping material and having the ends thereof extending substantially beyond the end portions of the wrapping material, the said end portions of the wrapping material being twisted about the contiguous portions of the fiber securing cord, and the ends of the said cord being fastened together binding the wrapping material tightly about the rotund meat cut; whereby the wrapping material and the securing cord are maintained securely in place on the rotund meat cut despite shrinkage of the meat cut.

5. In a cured meat product package, the combination comprising a meat cut of generally rotund shape which shrinks appreciably in volume after packaging, a sheet of cellophane wrapping material folded about the meat cut with the end portions of the wrapping material extending substantially beyond the ends of the said meat cut, and a cotton securing cord which shrinks about the wrapping material and the meat cut as the meat cut shrinks having a portion intermediate the ends thereof disposed lengthwise of the meat cut along its major axis between the meat cut and the wrapping material and having the ends thereof extending substantially beyond the end portions of the wrapping material, the said end portions of the wrapping material being twisted about the contiguous portions of the cotton securing cord, and the ends of said cord being fastened together binding the wrapping material tightly about the rotund meat cut; whereby the wrapping material and the securing cord are maintained securely in place on the rotund meat cut despite shrinkage of the meat cut.

JOHN W. AHRENS.

REFERENCES CITED

The following references are of record in the file of this patent:

UNITED STATES PATENTS

| Number | Name | Date |
| --- | --- | --- |
| 1,726,523 | Blows | Sept. 3, 1929 |
| 2,072,660 | Walter | Mar. 2, 1937 |
| 2,107,086 | Rumsey | Feb. 1, 1938 |
| 2,225,694 | Freeman | Dec. 24, 1940 |
| 2,358,685 | Bunn | Sept. 19, 1944 |

FOREIGN PATENTS

| Number | Country | Date |
| --- | --- | --- |
| 327,297 | Great Britain | Apr. 3, 1930 |